Patented Feb. 14, 1928.

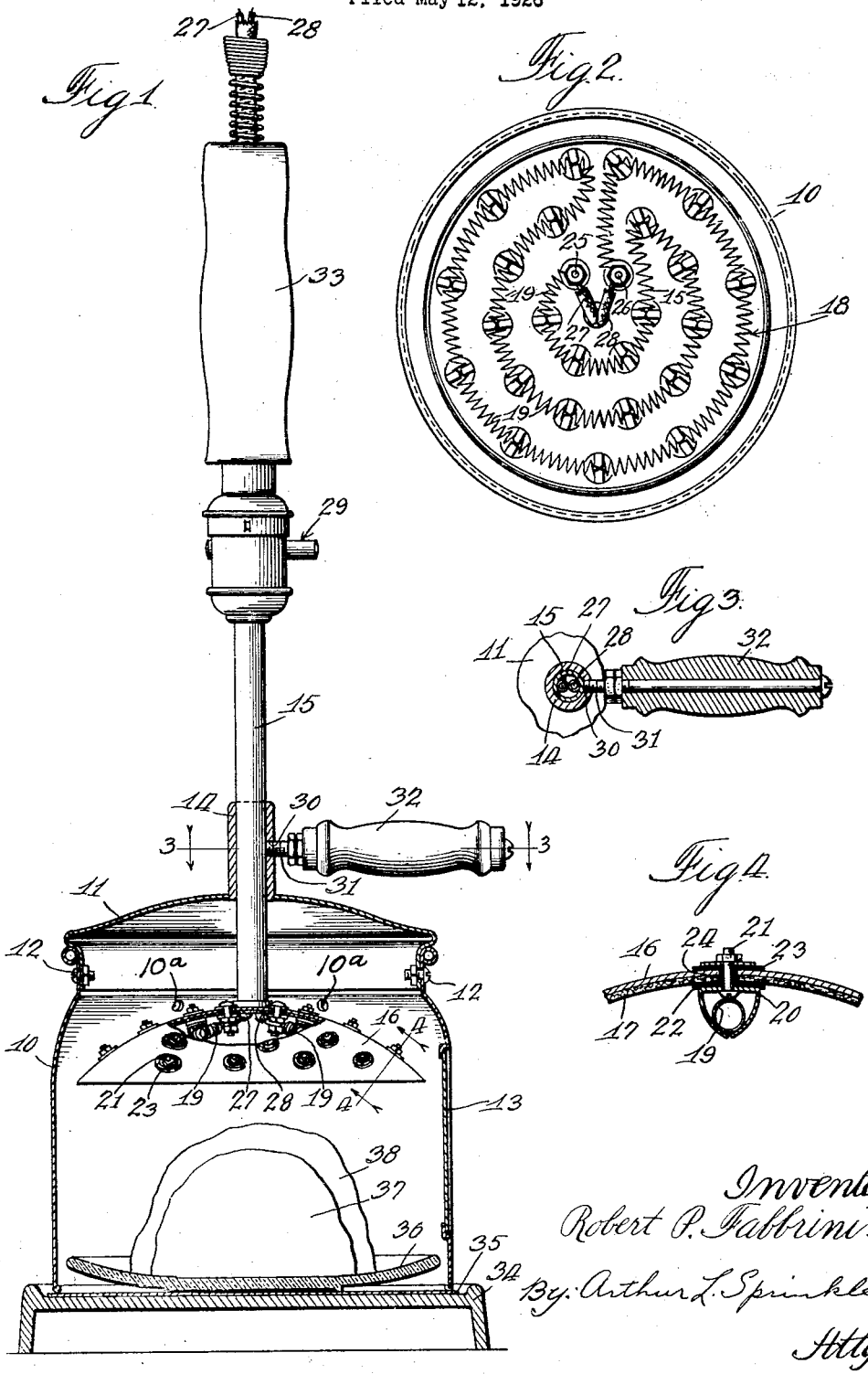

1,659,091

UNITED STATES PATENT OFFICE.

ROBERT PRECISE FABBRINI, OF CHICAGO, ILLINOIS.

PORTABLE OVEN.

Application filed May 12, 1926. Serial No. 108,467.

The invention relates to portable ovens, and particularly to portable devices of the character of an oven for the heat treatment of edibles, the invention in the form herein shown and described being particularly adaptable for use in connection with the treatment of edible materials on which a coating of meringue or the like is placed and which is then treated to a degree of heat sufficient for "browning" the surface of the meringue, as is the practice in the production of such edibles as lemon cream pies, baked Alaskas, baked ice cream and the like.

Among the objects to be secured by my invention are the following: To provide a device which is practical and efficient in its operation for rapidly applying a browning degree of heat to perishable edible substances; to provide a device of this character which shall be convenient to handle and cheap to manufacture; to provide a device of this character wherein the heating element of the device may be adjusted to various positions with respect to the casing of the device and to the edible substance under treatment, thereby enhancing the efficiency of the device and provide the adaptability of the same to the treatment of edibles of various sizes and dimensions.

One of the chief uses to which my invention is adapted, although not the only use, is in the preparation of what is termed "baked ice cream" in which frozen edible substances are placed in a dish or receptacle and covered with a meringue, or like analogous substance usually containing albuminous ingredients such as the whites of eggs, which, when subjected to a high degree of heat will, in a short interval of time, result in browning the exterior surface of the albuminous or analogous material without a degree of heat sufficient to permeate the coating of the meringue to melt the frozen ice cream or analogous edible.

In the preparation of such food articles, especially where a large number of people are to be served, it is desirable that as fast as the frozen food material is dished and the meringue covering applied the same shall be placed in the oven, and my invention is to provide a small portable heating device under which the edible material so prepared in a suitable receptacle may be heat treated, and the operator, in the interval of treatment, may be preparing another portion for immediate treatment. Obviously, such dishes are usually served immediately after being heat treated.

In the embodiment of the invention illustrated in the drawings—

Fig. 1 is a side elevation of the device, with the housing for the heating element and the food to be treated in vertical section. In this view the dish or other receptacle, as well as a detached base for the device, is shown in section. A portion of the heating element in this view is also shown in broken section to illustrate details of the construction thereof.

Fig. 2 is a bottom plan view of the heating element in the housing.

Fig. 3 is a transverse sectional plan view taken on the line 3—3 of Fig. 1, illustrating the manner of securing the heating element and its mounting in adjusted position with respect to the housing.

Fig. 4 is a section taken approximately on line 4—4 of Fig. 1 through the heating element, looking in the direction indicated by the arrows and illustrating a detail thereof.

The reference character 10 designates a housing which is shown as of cylindrical form having vents $10^a$ formed therein, and provided with a closure 11, which may be formed integrally therewith or attached thereto by bolts, as designated by reference character 12.

I find it is an advantage to construct the closure so that it is detachable from the body of the housing in the manner illustrated for obtaining ease of access to the heating element. A sight opening is preferably provided in the wall of the housing and covered with a transparent substance, as a sheet of mica, as designated by reference character 13, for enabling the operator to see the condition of the materials being treated within the housing.

Slidably mounted on the housing, and preferably in a sleeve 14 connected to the closure 11, is a stem or hollow tube 15 adjacent the lower end of which and within the housing 10 is mounted a dome-shaped member 16 provided adjacent its inner concave surface with a covering of suitable heat insulating material 17, such as asbestos or the like. The dome-shaped member 16 provides a support for an electrical heating element designated, as a whole, by the numeral 18, and comprising a series of coils 19 suitably supported on the member 16 adjacent the heat insulating material by means of brackets 20, the brackets 20 and their supporting bolts 21 being suitably insulated from the member 16 and material 17 by discs 22 and 23 on the inner and outer surfaces, respectively, of the dome-shaped member and by a sleeve 24 of insulating material surrounding the bolt 21. The terminals of the heating element 18 may be connected to binding posts 25 and 26 secured to and suitably insulated from the member 16, thereby providing an electrical connection between the heating element and a pair of electric conductors 27 and 28 extending longitudinally through the tube 15 and secured to the binding posts within the member 16.

Suitably positioned, preferably on the tube 15, is an electric switch 29 of the ordinary type having suitable connections with the conductors 27 or 28 for controlling the flow of current through said conductors to energize the heating element 18.

For adjusting the heating element with respect to the housing 10 to adapt the device to edible materials of various sizes and dimensions, the sleeve 14 may be provided with a screw-threaded opening 30 adapted to receive the shank of a set screw 31 having a grip portion 32 by which the end of the set screw may be forced against the outer face of the tube 15 to hold the latter in desired position.

A handle 33, preferably of heat insulating material, may be provided by which the device may be handled and the heating element moved to desired positions with respect to the housing without inconvenience to the operator by reason of the parts of the device becoming heated in the course of its use.

In the operation of the device as shown for illustrative purposes in Fig. 1, a base 34 may be provided on which, if desired, a heat insulating pad 35 may be placed to protect the table or the like on which the base is placed from heat generated by the device in the course of its use. On the pad 35 may be placed a dish 36 containing ice cream or the like, designated by numeral 37 and having a coating 38 of meringue or the like spread over the surface of the cream. Over the dish and coated ice cream is placed the housing 10 and the heating element raised or lowered within the housing to desired position, after which the electric current is switched on to energize the heating element for quickly browning the surface of the meringue, as above described. The action of the heating element on the meringue may be observed through the transparent material 13 of the sight opening, and when the particular food material under treatment has attained the desired degree of "browning" the device may be transferred to another serving and the operation repeated.

Obviously, the present invention is not limited to the specific construction and arrangement shown and described, but may be variously modified without departing from the spirit and scope of the invention as set forth in the appended claims. Moreover, all the features of the invention need not be used conjointly, as the same may be used in various combinations and sub-combinations.

I claim:

1. In a device of the class described, a housing, a heating element having a dome-shaped mounting within said housing, and means for adjusting said mounting and element with respect to said housing.

2. In a device of the class described, a housing, a heating element having a dome-shaped mounting within said housing, and means for adjusting said mounting and element axially with respect to said housing.

3. In a device of the class described, a housing having an open end, removable means connected to said housing, and adapted to close the opposite end thereof, a dome-shaped member slidably mounted in said removable means, electrical heating coils mounted in said member and insulated therefrom, means for controlling the energizing of said coils, means for moving said dome-shaped member and coils toward and from the open end of said housing, and means for securing said member and coils in desired position with respect to said open end.

4. In a device of the class described, a housing having a sight opening in the wall thereof and an open end, transparent means for covering said sight opening, removable means for closing the opposite end of the housing, a dome-shaped member slidably mounted in said removable means and having a sheet of heat insulating material adjacent its concave side, electrical heating coils mounted in said member adjacent said material and insulated from said material and member, a switch for controlling the energizing of said coils, and means for securing said coils in various positions with respect to the open end of said housing.

5. A device of the class described comprising in combination, a housing having an open end adapted to be positioned over edible materials for treatment by the device, said housing having vents and a sight opening in its side wall, a sheet of transparent material covering said sight opening, a removable closure connected to said housing and adapted to close the opposite end thereof, a tube slidably mounted in said closure, a dome-shaped member mounted on the inner end of said tube and provided with a sheet of heat insulating material adjacent its concave side, electrical heating coils mounted in said member adjacent said heat insulating material and insulated therefrom and from said member, a plurality of electrical current conductors in said tube and operatively connected with said coils, a switch mounted on said tube and operatively connected to said conductors for controlling the flow of current therethrough to energize said coils, a handle on said tube for moving said dome and heating coils toward and from the material under treatment, and means for securing said heating coils in desired position with respect to said edible materials.

6. In a device of the class described, the combination of a housing, a closure secured to one end thereof, a dome-shaped heat deflecting member mounted on said closure in a manner to be adjusted with respect thereto, a heating element mounted in said member, and means for securing said member and heating element in adjusted position with respect to said closure and housing.

In testimony whereof I have signed my name to this specification, on this 30th day of April, A. D. 1926.

ROBERT PRECISE FABBRINI.